US010290110B2

(12) United States Patent
Lawrence et al.

(10) Patent No.: US 10,290,110 B2
(45) Date of Patent: May 14, 2019

(54) VIDEO OVERLAY MODIFICATION FOR ENHANCED READABILITY

(71) Applicant: Intel Corporation, Santa Clara, CA (US)

(72) Inventors: Sean J. W. Lawrence, Bangalore (IN); Raghavendra Angadimani, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/201,812

(22) Filed: Jul. 5, 2016

(65) Prior Publication Data

US 2018/0012369 A1 Jan. 11, 2018

(51) Int. Cl.
*G06T 7/33* (2017.01)
*G06T 11/60* (2006.01)
*G06T 7/90* (2017.01)
*G06T 7/13* (2017.01)

(52) U.S. Cl.
CPC .................. *G06T 7/33* (2017.01); *G06T 7/13* (2017.01); *G06T 7/90* (2017.01); *G06T 11/60* (2013.01)

(58) Field of Classification Search
CPC ..... G06T 11/001; G06T 7/0042; G06T 1/007; G06T 1/60; G06T 7/0081; G06T 11/60; G06T 5/40; G06T 15/503; G06T 7/33
See application file for complete search history.

(56) References Cited

U.S. PATENT DOCUMENTS

| 4,954,970 A * | 9/1990 | Walker .................. G06T 11/001 345/639 |
| 5,600,773 A * | 2/1997 | Vanover .................... G09G 5/06 345/473 |
| 5,909,539 A * | 6/1999 | Chikauchi ............. G06T 11/206 358/1.13 |
| 9,349,201 B1 * | 5/2016 | Gault ....................... A63F 13/53 |
| 9,639,969 B1 * | 5/2017 | Wilson .................... G06T 11/60 |
| 2004/0017378 A1 * | 1/2004 | Lin ......................... G09G 5/397 345/592 |
| 2007/0279494 A1 * | 12/2007 | Aman .................... G01S 3/7864 348/169 |
| 2008/0074432 A1 * | 3/2008 | Sun ........................... G06F 3/14 345/520 |
| 2008/0284798 A1 * | 11/2008 | Weybrew ............... G06T 15/503 345/630 |
| 2009/0066716 A1 * | 3/2009 | Meulen .................... G09G 5/14 345/589 |
| 2011/0001873 A1 * | 1/2011 | Doswald ................ H04N 7/013 348/448 |

(Continued)

FOREIGN PATENT DOCUMENTS

EP 2373049 A1 * 10/2011 ........... H04N 17/004

*Primary Examiner* — Jingge Wu
(74) *Attorney, Agent, or Firm* — Womble Bond Dickinson (US) LLP

(57) ABSTRACT

Video overlays are modified to enhance readability. In one example a frame of a video sequence of frames is received and an overlay for display on the frame is received. A location of the overlay in the frame is determined. Background pixels in the frame that are in the overlay location are determined. Values of the identified pixels are analyzed and an overlay color is selected based on the analysis. The overlay is then blended into the frame using the selected overlay color.

20 Claims, 5 Drawing Sheets

(56) References Cited

U.S. PATENT DOCUMENTS

| | | | |
|---|---|---|---|
| 2011/0063325 A1* | 3/2011 | Saunders | G09G 5/00 345/639 |
| 2011/0102678 A1* | 5/2011 | House | H04N 9/75 348/584 |
| 2011/0149117 A1* | 6/2011 | Vendrig | H04N 5/2226 348/239 |
| 2012/0275671 A1* | 11/2012 | Eichhorn | G06T 7/0004 382/128 |
| 2014/0169666 A1* | 6/2014 | Hong | G06T 15/503 382/162 |
| 2014/0267723 A1* | 9/2014 | Davidson, Jr. | H04N 7/183 348/147 |
| 2014/0270504 A1* | 9/2014 | Baum | G06K 9/00744 382/165 |
| 2014/0378810 A1* | 12/2014 | Davis | G06T 5/40 600/407 |
| 2015/0279074 A1* | 10/2015 | Xiong | G06F 3/0418 345/629 |
| 2016/0077782 A1* | 3/2016 | Choi | G06F 3/1407 345/173 |
| 2016/0358592 A1* | 12/2016 | Rogoyski | G09G 5/40 |

* cited by examiner

VIDEO OVERLAY MODIFICATION FOR ENHANCED READABILITY

FIELD

The present description pertains to the field of video rendering and in particular to modifying overlays for improved readability.

BACKGROUND

Television broadcasters have long applied different overlays to video signals before they are transmitted. This may have started with subtitles and closed captioning. Overlays have expanded to include station or channel identification and other helpful signs and indicators. Some channels add banners, news tickers, scene descriptions, and personal name labels to a transmitted video. Recently compression systems have incorporated overlays as a separate component. This may result in overlays becoming used for more situations.

In order to make the subtitles or overlay more readable, the overlay is rendered in a very bright or a very dark color. In some cases, the overlay is placed outside the frame of the video. In some cases, the overlay is presented over a black or white box. In some cases, a subtitle is presented as white with a black outline or vice versa. All of these techniques are able to enhance the readability of the text or logo.

BRIEF DESCRIPTION OF THE DRAWING FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

DETAILED DESCRIPTION

In many cases, an overlay, such as subtitles or a channel logo, will be a similar color to the background behind and near the overlay. This may makes it difficult to view the overlaid content because it blends into the background. Black text, for example, becomes virtually invisible over a dark background, just as white text becomes virtually invisible over a light background. A complex background may render both black and white text difficult to read. When a large blank background is used to set off text or some other visual element, a larger than necessary portion of the video images will be blocked by the background. On the other hand the visual element becomes very easy to see.

As described herein the pixel values of overlaid content may be modified to obtain reasonably good contrast with respect to the background that is local to each pixel. As a result, the overlaid content is reasonably clear and readable and the rendered content also does not unnecessarily block out the main underlying content of the video.

Figure 1:
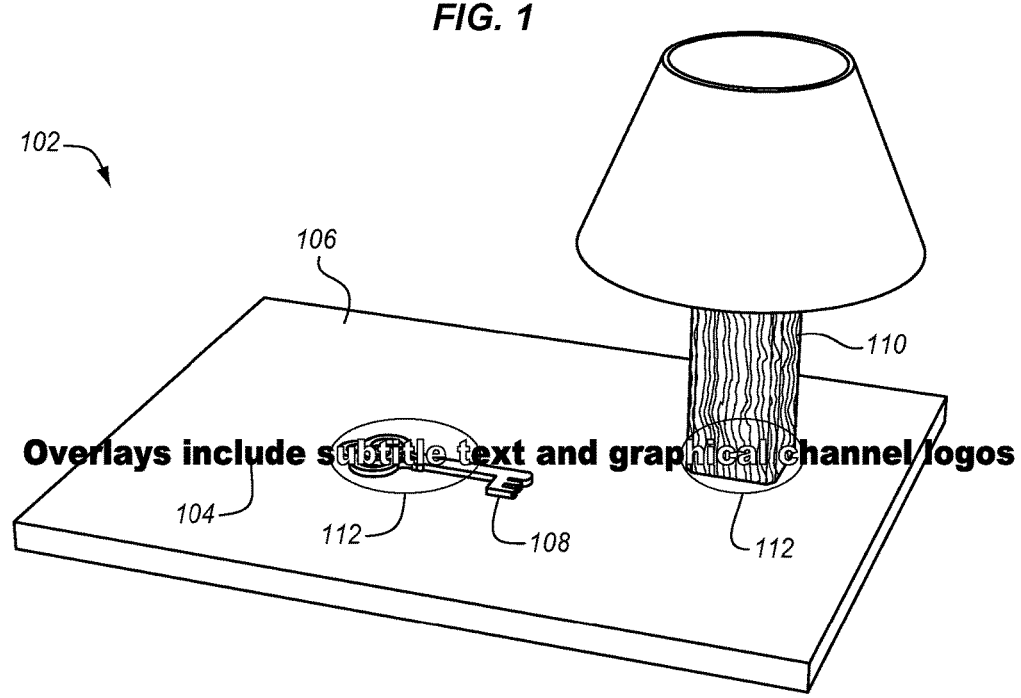
FIG. 1 is a diagram, of an example of presenting an overlay over an image according to an embodiment.

FIG. 1 is a diagram of an example of a portion of a frame 102 of a video sequence of frames. The frame has a table top 106 with a key 108 in the middle and a lamp 110 on one side. In this example the overlay 104 is a text string. The text string runs across the key and the lamp base. As shown the text is somewhat difficult to see over the key and more difficult to see over the lamp base. The lamp base has a complex woodgrain pattern. Other complex patterns may also interfere with the readability of the text. In order to improve contrast, the text is rendered in a different color first in the area 112 over the key and also in the area 112 over the lamp base. This color is different from the primary colors of the key and the lamp base to render the text easier to read.

Figure 2:
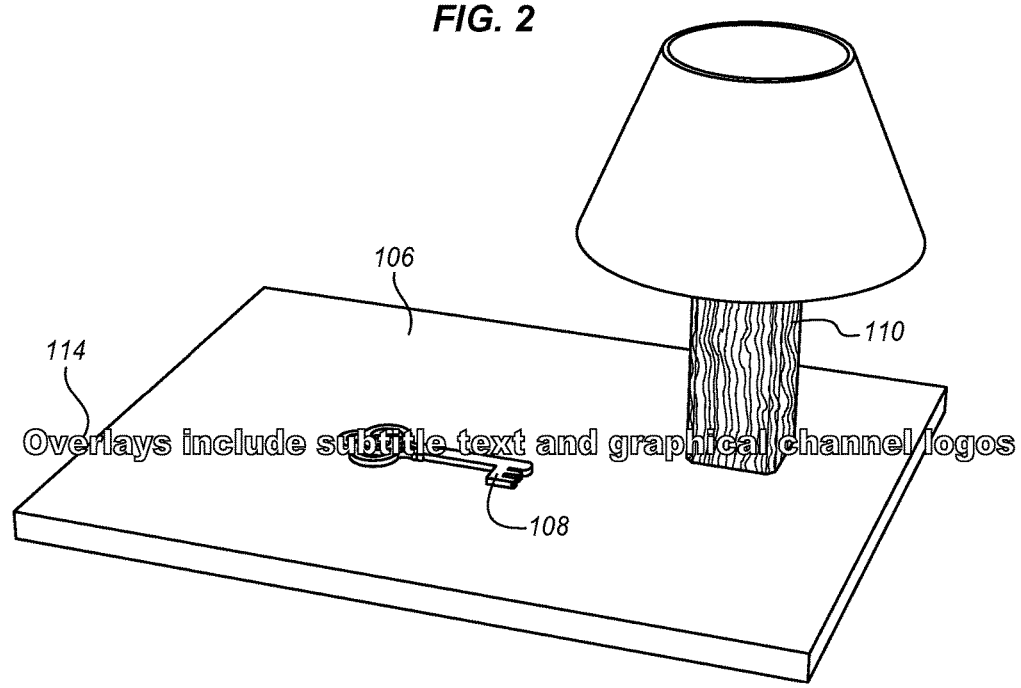
FIG. 2 is a diagram, of an example of presenting an alternative overlay over an image according to an embodiment.

FIG. 2 is a diagram which is the same as FIG. 1 except that the text 114 has been made brighter in all spaces including over the key lamp base to render the text easier to read. This is an example of changing the brightness of the text to make the text easier to read. The color of the text may also be changed but color is not shown in the diagram. The modification of the subtitle character color may be based on the local background behind and near the characters.

Figure 3:
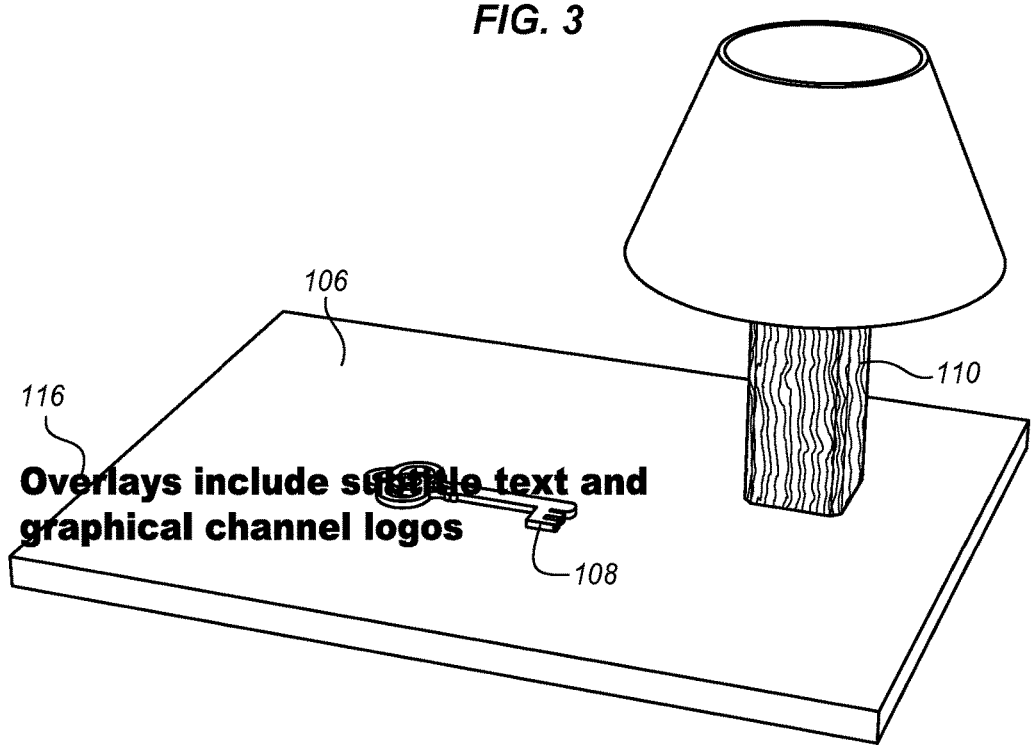
FIG. 3 is a diagram, of an example of presenting a further alternative overlay over an image according to an embodiment.

FIG. 3 is a diagram which is the same as in FIG. 1 except that the text 116 over the lamp base 110 has been moved to another line so that the text is easier to see over the simpler background of the table 106 without the complexity of the lamp base. This is an example of analyzing pixels in the region near the overlay. The subtitles are moved to avoid displaying the subtitles on areas that may cause difficult reading due to low contrast or complex background structures.

Figure 4:
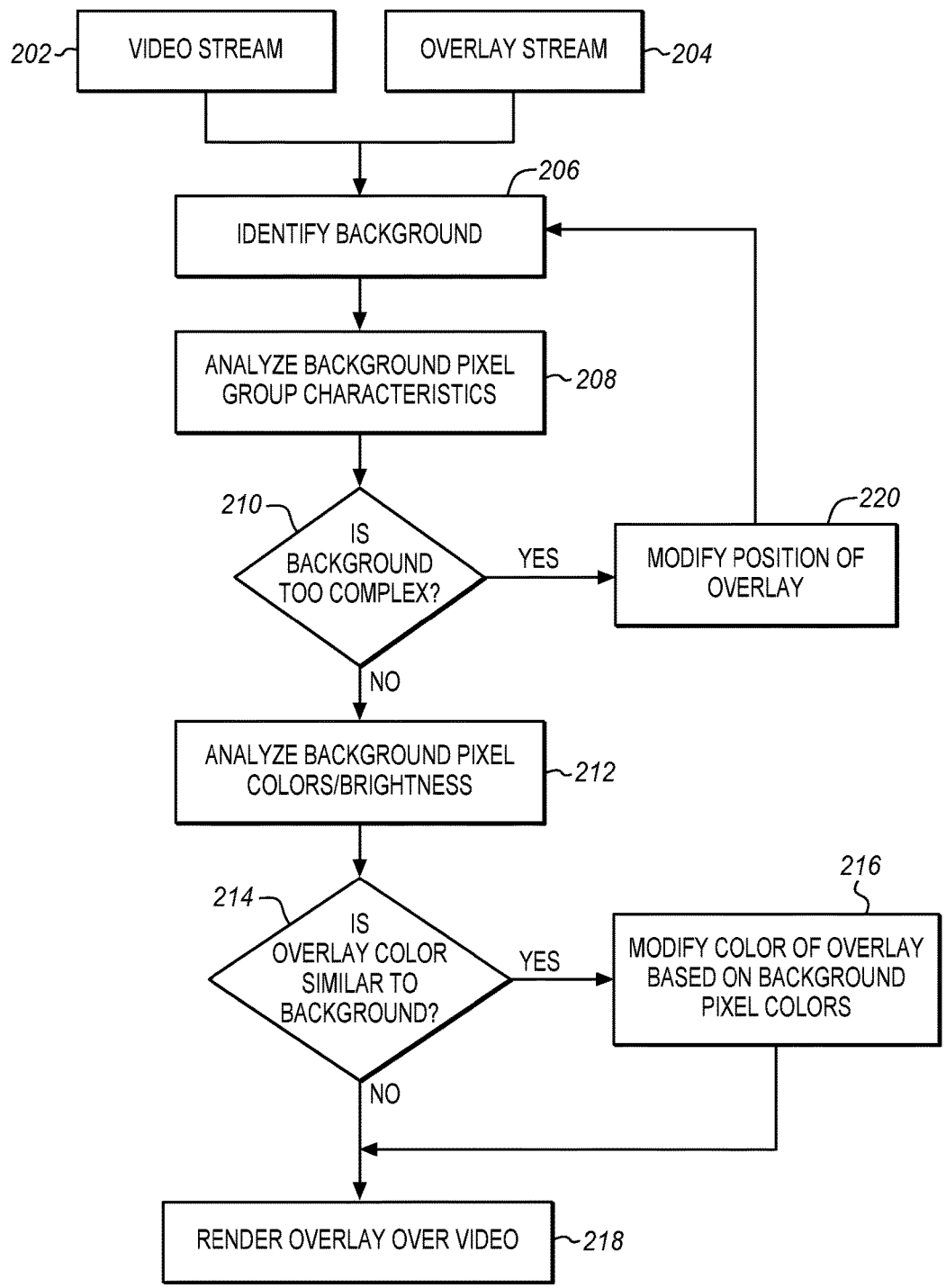
FIG. 4 is a process flow diagram of rendering overlays over a video according to an embodiment.

FIG. 4 is a process flow diagram of modifying an overlay based on an underlying image. A video stream is provided from a buffer 202 and a subtitle or other overlay is provided from another buffer 204. The buffers may be part of a decoder or encoder or another component. The overlays are discussed in the context of subtitles, however, any other type of overlay may be used. The overlay may be embedded in the source video or it may be generated locally. In one example, the overlays are control system menus for operating a local advice and for providing alerts to viewers. The input video may be an external video stream from storage or a remote source or it may be locally generated. The local video may be a background image for a menu system or a current image from a local camera.

The video stream and overlay are provided to pixel identifier 206. This component identifies the background pixels in the video frame. Specifically the background pixels correspond to the location in the image in which the subtitles will be displayed. The identified pixels will be in the same position as the subtitle and also within a predetermined number of pixels from each character of the subtitles.

After the pixels are identified then the pixel identification data is sent to a pixel analysis component 208. The background pixel values around each pixel are analyzed for group characteristics. This may be done using a spatial analysis such as DCT (Discrete Cosine Transform), Wavelets analysis, etc. Any other method to quantify spatial complexity may be used. After this analysis then there is a decision block at 210 to determine if the pattern of the background pixels is too complex, too noisy, or too similar to the overlay.

If the complexity as measured using any of a variety of quantities is determined to be too high then the operations go to modify the position of the overlay at 220. This movement of the overlay is to avoid the complex background. As a result the entire overlay or only a portion of the overlay may be moved depending on the nature of the overlay. For text as shown above, the text may stop and start a new line in order to avoid a certain area. After the overlay is moved, the process returns to determine the new background pixels at 206 and then determine whether the new background pixels are too complex.

If the background is not too complex, noisy, or similar to the overlay then the process continues to 212 to analyze the colors and the brightness of the background pixels. This may be done by developing a histogram or some other table or matrix of values to determine the distribution of colors and brightness levels.

The color and brightness analysis 212 is sent to a comparison component 214 to compare the background pixel values to a set of standards. While the complexity is measured using group characteristics, the contrast may be measured using individual characteristics by a histogram, threshold or the like.

As with the pixel group characteristics, these individual background pixel characteristics may be represented by a simple set of thresholds or a more complex comparison may be made. The comparison component may make one or more comparisons to determine how to represent the subtitles.

The contrast may be compared to determine whether the subtitles will stand out from the background. This may be done by comparing individual pixels to compare the background color to the subtitle color. If the subtitle color is not sufficiently different then at 216, the subtitle color is modified to provide sufficient contrast.

The video may then be rendered at 218 with the subtitles as modified at 216, 220 or both. If the background is not too complex at 210 and the contrast is sufficient at 214, then the video is rendered 218 without modification.

As described herein a better user experience is achieved with subtitles and other forms of overlay content. These improvements may be applied to home entertainment, to large content displays, and to many other systems. Embodiments may be implemented locally on displays or on server platforms before the content is delivered.

Figure 5:
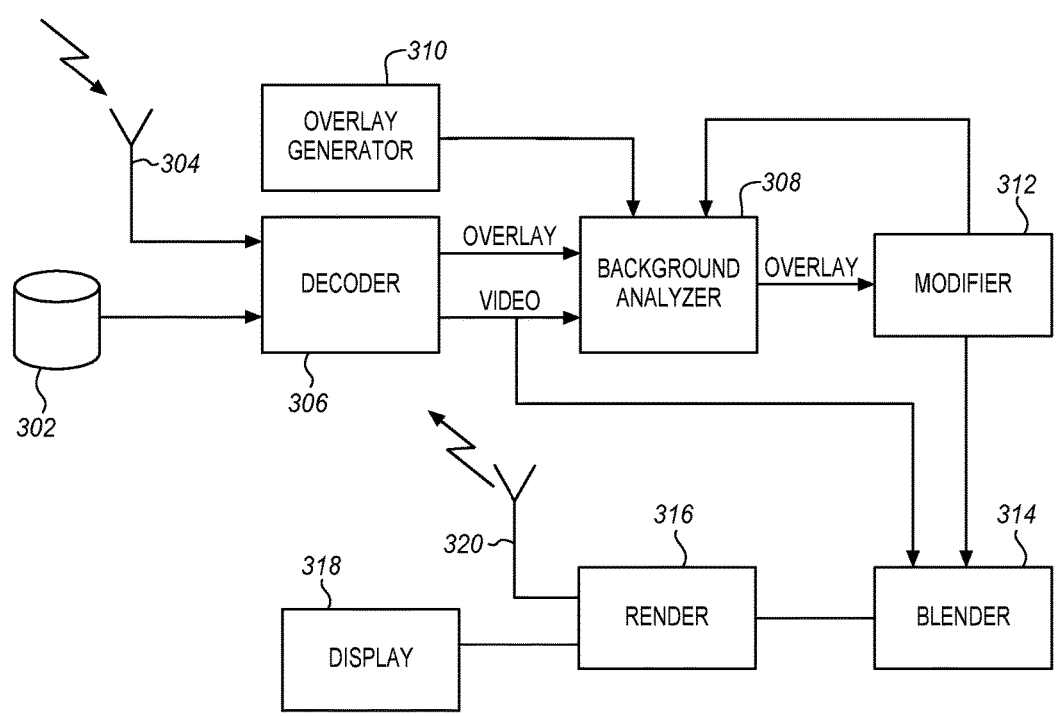
FIG. 5 is a block diagram of a video decoding and rendering system with overlay modification according to an embodiment.

FIG. 5 is an example of a video decoding and rendering system with overlay modification as described herein. The system may be a set-top box, smart television, or any other desired type of media player. The system receives a video bitstream at a decoder which contains representations of the content video and of an overlay. The video may be received from a mass storage device 302, received in a receiver 304 from a remote transmitter which may be wired or wireless or generated by local cameras (not shown). The video is received at a decoder 306.

The decoder separates the video images from the overlays and provides both to a background analyzer 308. This analyzer may perform many other functions. For example DCTs may be generated for other reasons and used by the present process as well. In some embodiments, the video is decoded into primary pictures of the sequence of frames and auxiliary pictures of the sequence of frames. The auxiliary pictures may be identified by SEI messages from an HEVC video.

There may optionally be a local overlay generator 310 that provides overlays to the background analyzer. These overlays may be instead of or in addition to the overlays that are encoded into the video. The local overlays may contain local information such as system status and a command interface. The local overlays may also be generated from remote information sources received by the system.

The background analyzer 308 generates quantitative representations of the background pixels at and near the location of the overlays. This information is then used by a modifier 312 which modifies the appearance or position of the overlays or both. If an overlay is moved then this information may be returned to the analyzer to analyze background pixels in the new location. If the analysis shows that the overlays will be readable or legible based on thresholds or other types of comparisons, then the modifier makes no changes for those overlays.

The modified overlays are then provided to a blender 314. The blender receives the overlays from the modifier and the video from the decoder 306 and blends these together to generate a combined video suitable for display.

Figure 6:
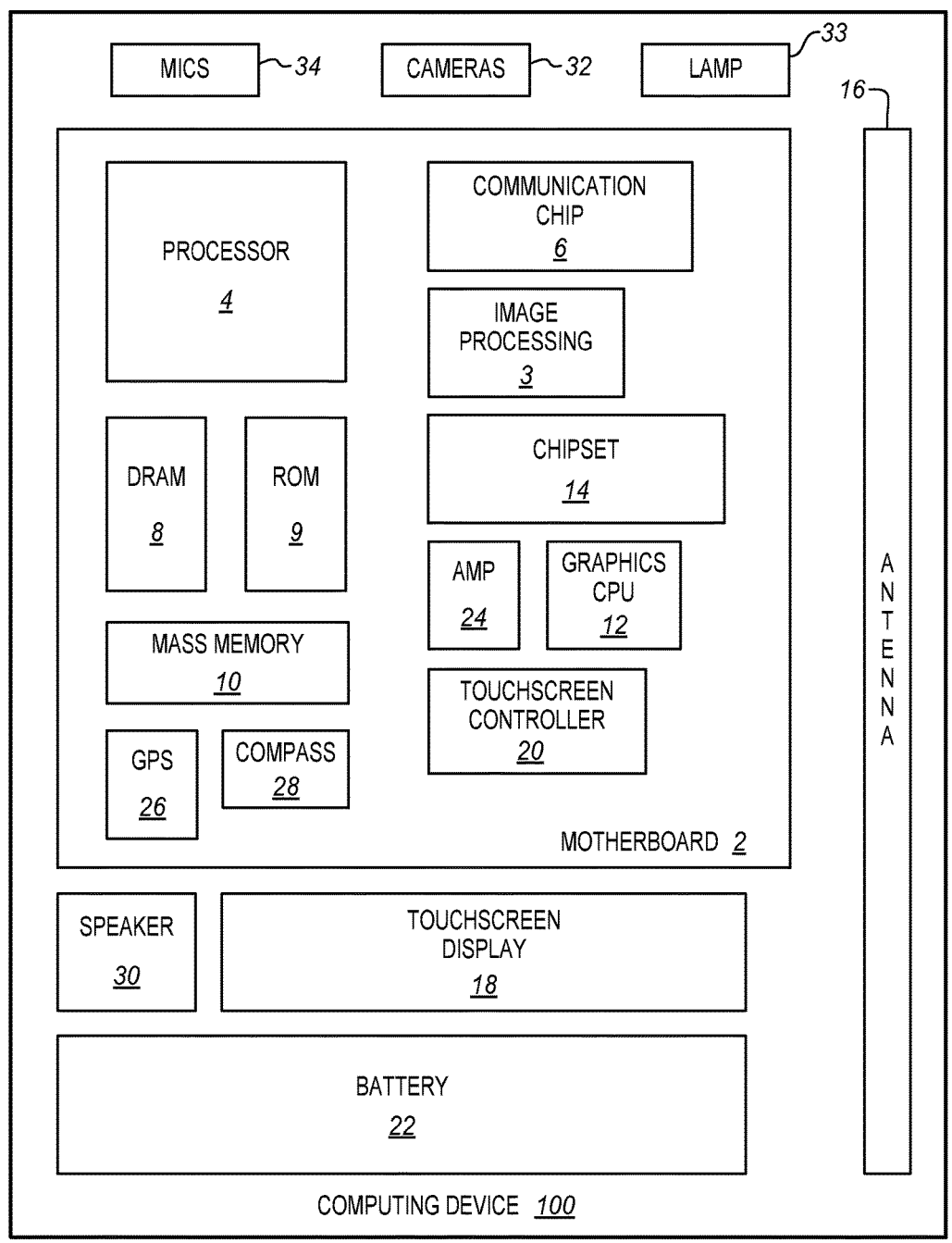
FIG. 6 is a block diagram of a computing device suitable for video encoding and decoding according to an embodiment.

The combined video frames are provided to a renderer 316 to convert the combined video to a format suitable for display. The renderer may be coupled directly or indirectly to a display 318 to show the video with the overlays. The display may be a part of the same device as the analyzer and renderer as shown in FIG. 6 or it may be a connected device. The renderer may also be coupled to a wireless or wired transmitter 320 to send the images to a remote display. The remote display may be in another location within the same facility or at a more distant location.

FIG. 6 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a lamp 33, a microphone array 34, and a mass storage device (such as a hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 capture video as a sequence of frames as described herein. The image sensors may use the resources of an image processing chip 3 to read values and also to perform exposure control, shutter modulation, format conversion, coding and decoding, noise reduction and 3D mapping, etc. The processor 4 is coupled to the image processing chip and the graphics CPU 12 is optionally coupled to the processor to perform some or all of the process described herein for modifying overlays and to render video from the memory, received through the communications chip or both.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving a frame of a video sequence of frames, receiving an overlay for display on the frame, determining a location of the overlay in the frame, identifying background pixels in the frame that are in the overlay location, analyzing values of the identified pixels, selecting an overlay color based on the analysis, and blending the overlay into the frame using the selected overlay color.

In further embodiments the overlay is a text string.

In further embodiments the text string is a subtitle.

In further embodiments selecting an overlay color comprises selecting a color with more than a pre-determined contrast compared to the analyzed values.

In further embodiments analyzing values comprises generating a histogram of pixel color and brightness and wherein selecting an overlay color comprises selecting a color using the histogram.

In further embodiments selecting an overlay color comprises not modifying the overlay color if the overlay has sufficient contrast to the background pixels.

Further embodiments include determining a complexity of the frame in the location of the background pixels and modifying the overlay based on the complexity.

In further embodiments modifying comprises moving the location of the overlay in the frame.

In further embodiments determining a complexity comprises generating a discrete cosine transform of the background pixels and comparing a spatial analysis of the DCT to a threshold.

In further embodiments determining a complexity comprises performing a wavelets analysis of the background pixels and comparing a spatial analysis of the wavelets analysis to a threshold.

Further embodiments include transmitting the blended frame to a head end transmitter.

Further embodiments include rendering the blended frame on a display.

Some embodiments pertain to an apparatus that includes a memory to store a video sequence of frames, a decoder to receive a frame of the video sequence of frames, an overlay generator to generate an overlay for display on the frame, a background analyzer to determine a location of the overlay in the frame, to identify background pixels in the frame that are in the overlay location, to analyze values of the identified pixels, and to select an overlay color based on the analysis, and a blender to blend the overlay into the frame using the selected overlay color.

In further embodiments the background analyzer selects an overlay color with more than a pre-determined contrast compared to the analyzed values.

In further embodiments the background analyzer analyzes values by determining pixel color and brightness of the background and selecting an overlay color that is darker than the pixel color.

In further embodiments background analyzer selects an overlay color by not modifying the overlay color if the overlay has sufficient contrast to the background pixels.

In further embodiments the background analyzer further determines a complexity of the frame in the location of the background pixels and moves the location of the overlay in the frame if the background pixels are too complex.

Some embodiments pertain to a video system that includes a receiver to receive a video sequence of frames, a memory to store the received video sequence, a processor to decode the stored video sequence, to generate an overlay for display on the frame, to determine a location of the overlay in the frame, to identify background pixels in the frame that are in the overlay location, to analyze values of the identified pixels, to select an overlay color based on the analysis, and to blend the overlay into the frame using the selected overlay color, and a display to show the rendered video with the overlay.

In further embodiments the processor is a graphics processing unit.

In further embodiments, the processor determines a complexity of the frame in the location of the background pixels using a discrete cosine transform of the background pixels and moves the location of the overlay in the frame if the frame is too complex in the location of the background pixels.

What is claimed is:

1. A method comprising:
    receiving a frame of a video sequence of frames in a buffer of a processor-based rendering system;
    receiving an overlay for display on the frame in the buffer of the rendering system;
    determining a location of the overlay in the frame in a background analyzer of the rendering system;
    identifying background pixels in the frame that are in the overlay location in the background analyzer of the rendering system;
    analyzing values of the identified pixels to determine whether the identified pixels create a complex background in the background analyzer of the rendering system, including determining spatial complexity of the frame in a location of the background pixels;
    in response to determining that the identified pixels create a complex background, moving the overlay away from the complex background based on the analyzing in a modifier of the rendering system and the determined spatial complexity of the frame; and
    blending the overlay into the frame using the moved overlay position in a blender of the rendering system.

2. The method of claim 1, wherein the overlay is a text string.

3. The method of claim 1, further comprising:
    analyzing the colors and the brightness in the background pixels in the frame;
    determining a contrast between individual pixels of a location of the background, where the overlay is to be positioned, with individual pixels of the overlay;
    in response to determining that there is insufficient contrast between the overlay and the location of the background, moving the overlay to a different location of the background.

4. The method of claim 1, further comprising selecting a color with more than a pre-determined contrast compared to the analyzed values.

5. The method of claim 4, wherein analyzing values comprises generating a histogram of pixel color and brightness and wherein selecting an overlay color comprises selecting a color using the histogram.

6. The method of claim 1, further comprising selecting an overlay color by not modifying the overlay color if the overlay has sufficient contrast to the background pixels.

7. The method of claim 1, further comprising determining a complexity of the frame in the location of the background pixels and modifying the overlay based on the complexity.

8. The method of claim 7, wherein modifying comprises moving the location of the overlay in the frame.

9. The method of claim 7, wherein determining a complexity comprises generating a discrete cosine transform of the background pixels and comparing a spatial analysis of the DCT to a threshold.

10. The method of claim 7, wherein determining a complexity comprises performing a wavelets analysis of the background pixels and comparing a spatial analysis of the wavelets analysis to a threshold.

11. The method of claim 1, further comprising transmitting the blended frame to a head end transmitter.

12. The method of claim 1, further comprising rendering the blended frame on a display.

13. An apparatus comprising:
    a memory to store a video sequence of frames;
    a decoder to receive a frame of the video sequence of frames;
    an overlay generator to generate an overlay for display on the frame;
    a background analyzer to determine a location of the overlay in the frame, to identify background pixels in the frame that are in the overlay location, to analyze values of the identified pixels, to determine whether the identified pixels create a complex background by, at least in part, determining spatial complexity of the frame in a location of the background pixels, and, in response to determining that the identified pixels create a complex background, to move the overlay away from the complex background based on the analysis and the determined spatial complexity of the frame; and
    a blender to blend the overlay into the frame using the moved overlay position.

14. The apparatus of claim 13, wherein the background analyzer selects an overlay color with more than a pre-determined contrast compared to the analyzed values.

15. The apparatus of claim 13, wherein the background analyzer analyzes values by determining pixel color and brightness of the background and selects an overlay color that is darker than the pixel color.

16. The apparatus of claim 13, wherein background analyzer selects an overlay color by not modifying the overlay color if the overlay has sufficient contrast to the background pixels.

17. The apparatus of claim 13, wherein the background analyzer further determines a complexity of the frame in the location of the background pixels using a spatial analysis and moves the location of a portion of the overlay in the frame to a position having a lower complexity based on the spatial analysis.

18. A video system comprising:
    a receiver to receive a video sequence of frames;
    a memory to store the received video sequence;

a processor to decode the stored video sequence, to generate an overlay for display on the frame, to determine a location of the overlay in the frame, to identify background pixels in the frame that are in the overlay location, to analyze values of the identified pixels, to determine whether the identified pixels create a complex background by, at least in part, determining spatial complexity of the frame in a location of the background pixels, in response to determining that the identified pixels create a complex background, to move the overlay away from the complex background based on the analysis and the determined spatial complexity of the frame, and to blend the overlay into the frame using the moved overlay position; and a display to show the rendered video with the overlay.

19. The video system of claim 18, wherein the processor is a graphics processing unit.

20. The video system of claim 18, wherein the processor determines a complexity of the frame in the location of the background pixels using a discrete cosine transform of the background pixels and moves the location of a portion of the overlay in the frame to a location that is less complex in the location of the background pixels.

\* \* \* \* \*